United States Patent
Karrelmeyer et al.

(10) Patent No.: US 7,522,984 B2
(45) Date of Patent: Apr. 21, 2009

(54) METHOD AND SYSTEM FOR DETERMINING THE POINT OF ENGAGEMENT OF A CLUTCH OPERABLE VIA AN ACTUATING DEVICE

(75) Inventors: Roland Karrelmeyer, Bietigheim-Bissingen (DE); Sven Wolfgarten, Tienen (DE); Jean-Sebastien Knaus, Roeschwoog (FR)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 10/562,642

(22) PCT Filed: Jun. 18, 2004

(86) PCT No.: PCT/DE2004/001269

§ 371 (c)(1),
(2), (4) Date: May 4, 2006

(87) PCT Pub. No.: WO2005/005852

PCT Pub. Date: Jan. 20, 2005

(65) Prior Publication Data

US 2007/0061060 A1    Mar. 15, 2007

(30) Foreign Application Priority Data

Jun. 25, 2003    (DE) .............................. 103 28 712

(51) Int. Cl.
*G06F 7/00* (2006.01)
(52) U.S. Cl. .................................................. 701/67
(58) Field of Classification Search ............ 701/67; 73/115.01, 115.04; 192/3.51–3.55, 30 R; 475/8; 477/13, 39

See application file for complete search history.

(56) References Cited

U.S. PATENT DOCUMENTS 6,647,326 B2 * 11/2003 Nakamori et al. ............. 701/22
7,150,333 B2 * 12/2006 Noda et al. ................. 180/65.2

FOREIGN PATENT DOCUMENTS

| DE | 44 33 825 | 4/1996 |
| DE | 101 59 267 | 6/2002 |
| WO | 02/18814 | 3/2002 |

* cited by examiner

*Primary Examiner*—Yonel Beaulieu
(74) *Attorney, Agent, or Firm*—Kenyon & Kenyon LLP

(57) ABSTRACT

A method and system for determining the point of engagement of a clutch of a motor vehicle operable via an actuating device, where the actuating device has an electrically drivable positioning motor that is operationally linked to an actuating mechanism which actuates the clutch and operates via a control unit. The point of engagement is determined through an application of a constant voltage to the positioning motor in a first operating mode. The motor speed is detected as a function of the rotational angle position. The motor current is detected as a function of the rotational angle position, and/or by application of a constant current to the positioning motor in a second operating mode. The point of engagement is determined from the detected values of the motor speed, that are a function of the rotational angle position and from the values of the motor current.

15 Claims, 9 Drawing Sheets

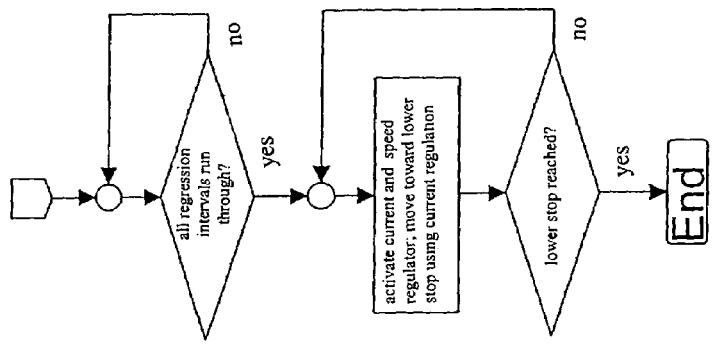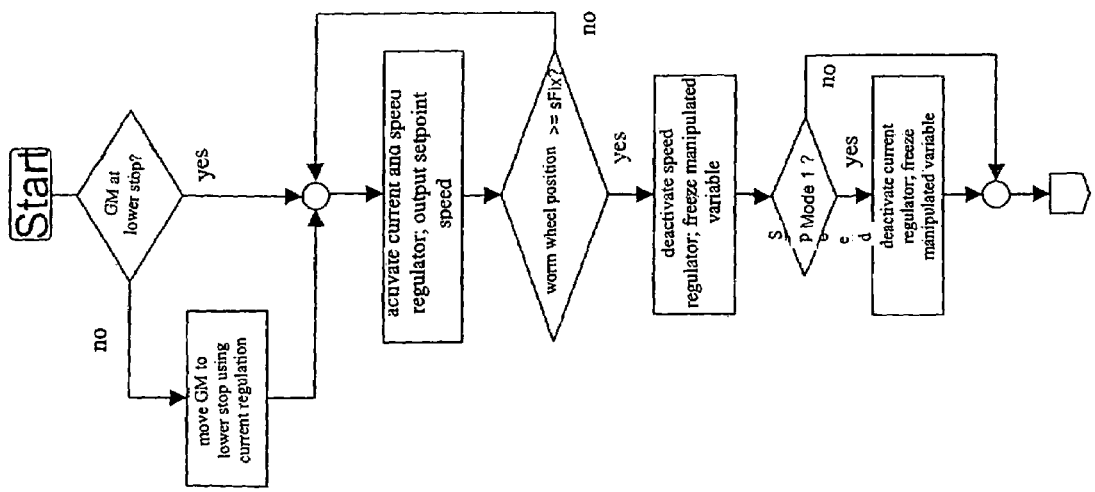
Figure 7

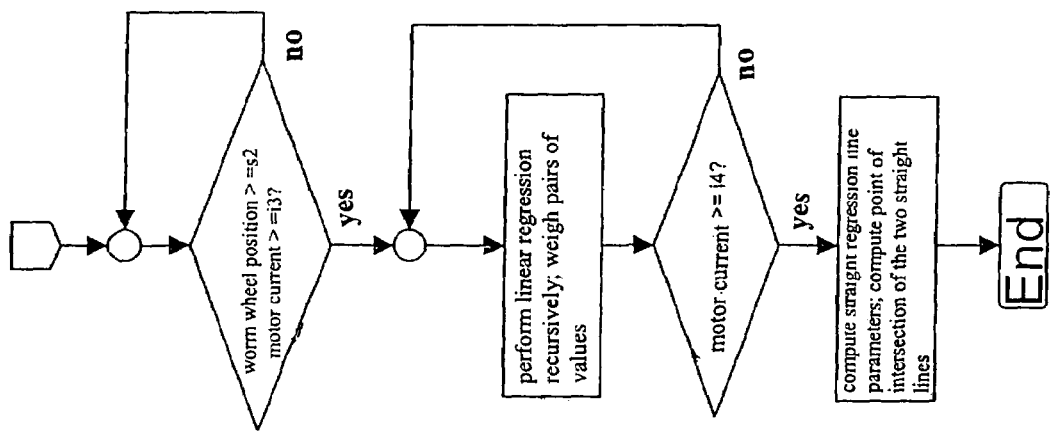
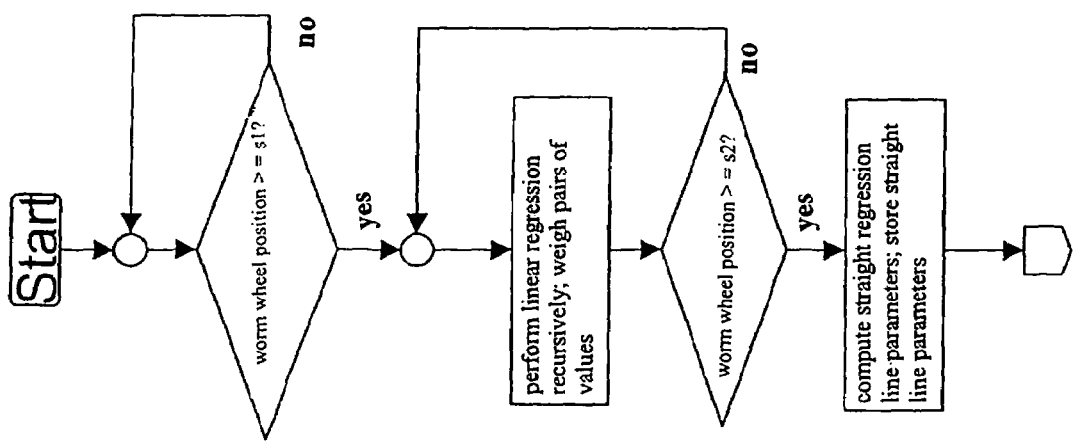
Figure 9

METHOD AND SYSTEM FOR DETERMINING THE POINT OF ENGAGEMENT OF A CLUTCH OPERABLE VIA AN ACTUATING DEVICE

FIELD OF THE INVENTION

The present invention relates to a method and a system for determining the point of engagement of a clutch operable via an actuating device.

BACKGROUND INFORMATION

Efficient vehicle dynamics are achievable in vehicles having all-wheel drive via a controlled distribution of the drive power to the front and rear axles. A transfer case (VG) is used as an actuator for power distribution. The main part of this transfer case is a multidisk clutch (MSK) which transfers the torque to the power take-off side of the vehicle as a function of the pressing force exerted on its lamellas. The mechanical construction of the transfer case allows the precision distribution required within the specification, exclusively by exerting a force on the actuating mechanism. This actuating force is generated, for example, using an eccentric disk and a pantograph mechanism, in general by a geared or positioning motor (GM), in particular by a DC motor having a worm gear. FIG. 1 shows the actuating chain of the transfer case and its components: DC motor (101), worm gear (102), eccentric disk (103), pantograph (104), and multidisk clutch (105).

For cost reasons, force or torque sensors are frequently omitted in the design of the geared motor's control. Instead, the actuating characteristic of the transfer case is saved in the control unit (SG) in the form of a torque-actuator travel characteristic curve (201) (FIG. 2), whereby the actuating intervention is attributed to a positioning of the eccentric disk, i.e., to a position regulation of the geared motor. The central point of the characteristic curve is the engagement point (202) also known as the kiss point. This is the point at which the multidisk clutch begins to transfer torque. The multidisk clutch setting as a function of the length of operation causes an angular shift in the characteristic curve stored in the control unit.

A calibration procedure may be used to detect the shift in the point of engagement. The speed-regulated geared motor is used here as a sensor to reconstruct the point of engagement. The eccentric disk is rotated by the positioning motor at a constant speed against the actuator load torque generated by the clutch. If the motor current is then recorded using measuring technology (FIG. 3), it may be averaged at three characteristic angular positions of the eccentric disk. Two straight lines (301, 302) may then be constructed using the three current/angle points, the point of intersection of which would represent the point of engagement. Straight line (301) is assumed here to be a horizontal line.

However, the motor current represents the actuating torque only for a constant and precisely known transmission efficiency. For the positioning motors and actuating mechanisms normally used, the efficiency varies not only as a function of the individual component and the service life, but also, for example, as a function of the worm wheel angle (which tooth of the worm wheel is engaged). In the case of speed-regulated operation, an efficiency which varies over the worm wheel position results in a current excitation, i.e., in a local distortion of the current characteristic curve, FIG. 3. Such a distortion, if located in the range of the averaging points, results in erroneous determination of the point of engagement.

SUMMARY OF THE INVENTION

Therefore, a special triggering of the positioning motor and evaluation of the system quantities motor current and worm wheel speed are used. The positioning motor is triggered during calibration via a cascaded current/speed regulator, and the system quantities motor current, motor speed (worm wheel speed) and rotational angle position (worm wheel angle) are recorded. Active speed regulation causes the positioning motor to rotate the eccentric disk at a constant speed to a worm wheel angle s1, which is located in the free travel path of the clutch mechanism. Starting at s1, the regulator states are frozen, whereby the positioning motor rotates the eccentric disk in a voltage-controlled manner to a standstill against the increasing load torque of the clutch actuator. The obtained signal curves of motor current and worm wheel speed=eccentric disk speed, FIG. 4, are thus freed from the influence of the regulator and thus from an excitation which acts thereby as interference. Two signal curves are obtained, which may be used for determining the point of engagement. The application of the linear regression method, applied to the current and speed curves regarding intervals (401) and (402), is characterized by higher robustness against local transmission efficiency fluctuations than is the case when only the current curve is evaluated point-by-point.

BRIEF DESCRIPTION OF THE DRAWINGS

FIG. 7 shows a signal flow diagram of the control.

FIG. 9 shows the signal flow diagram of the analysis.

DETAILED DESCRIPTION

Figure 1:
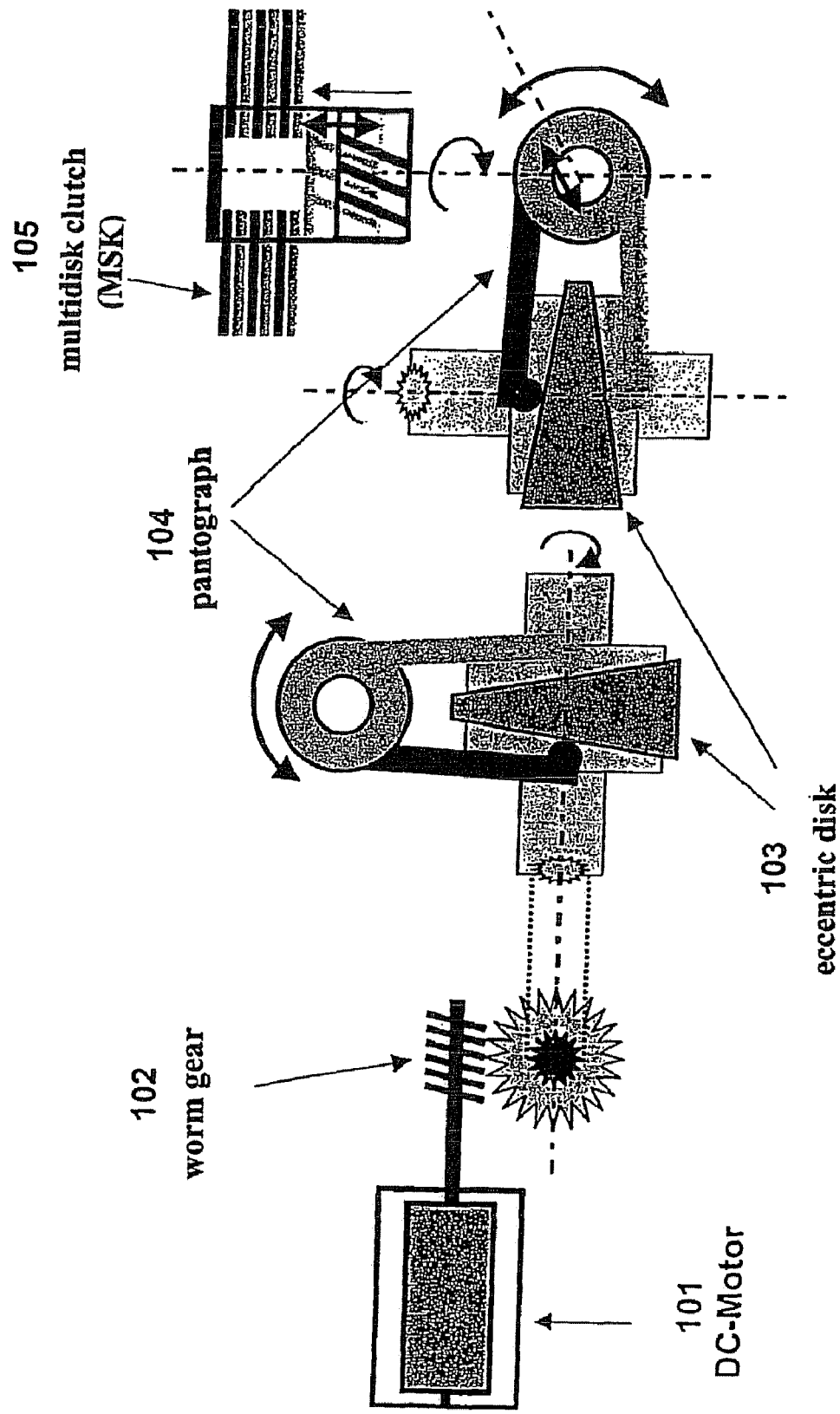
FIG. 1 shows a conventional actuating chain of the transfer case and its components, a DC motor (101), a worm generator (102), an eccentric disk (103), a pantograph (104), and a multidisk clutch.
Figure 2:
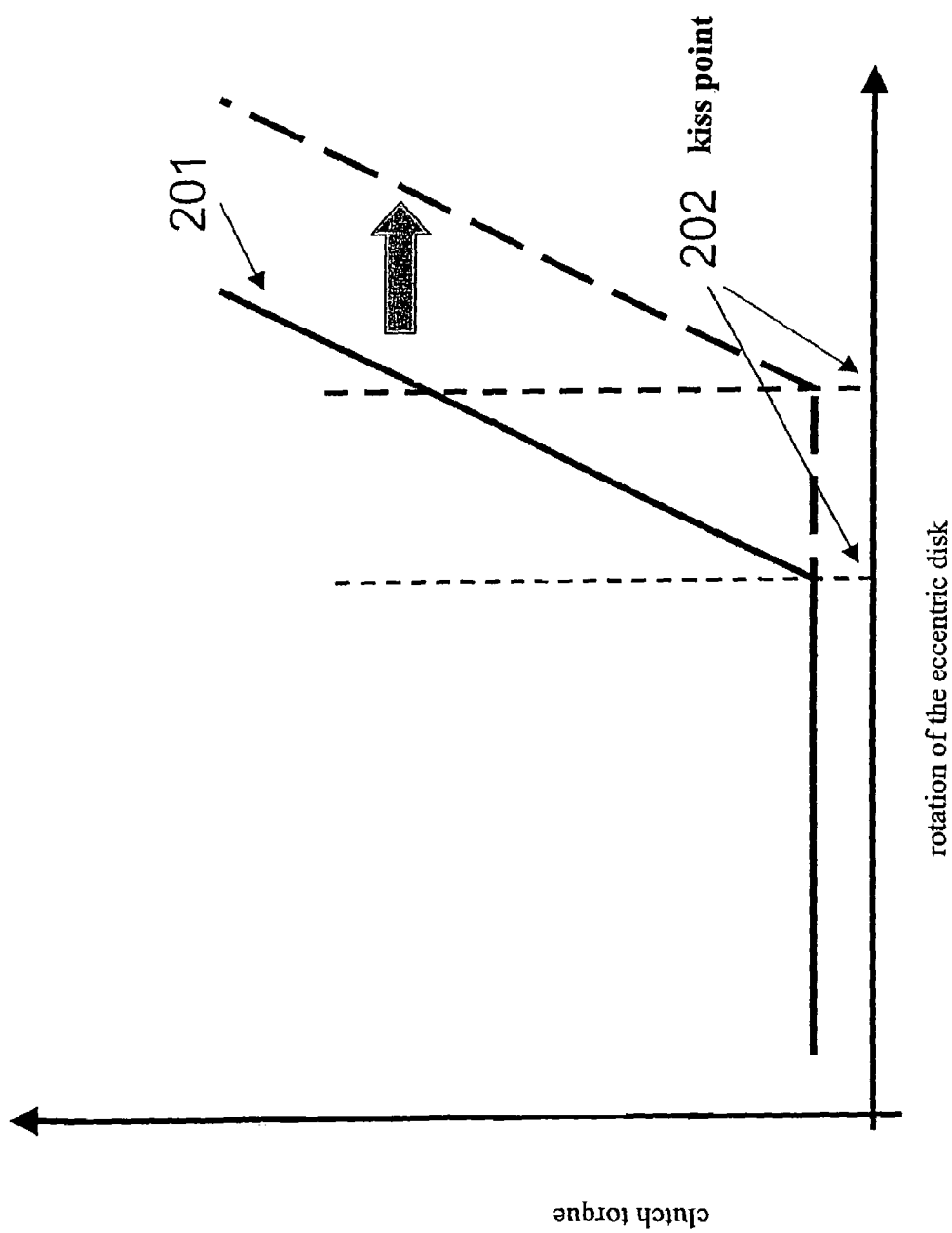
FIG. 2 shows a torque-actuator travel characteristic curve.
Figure 3:
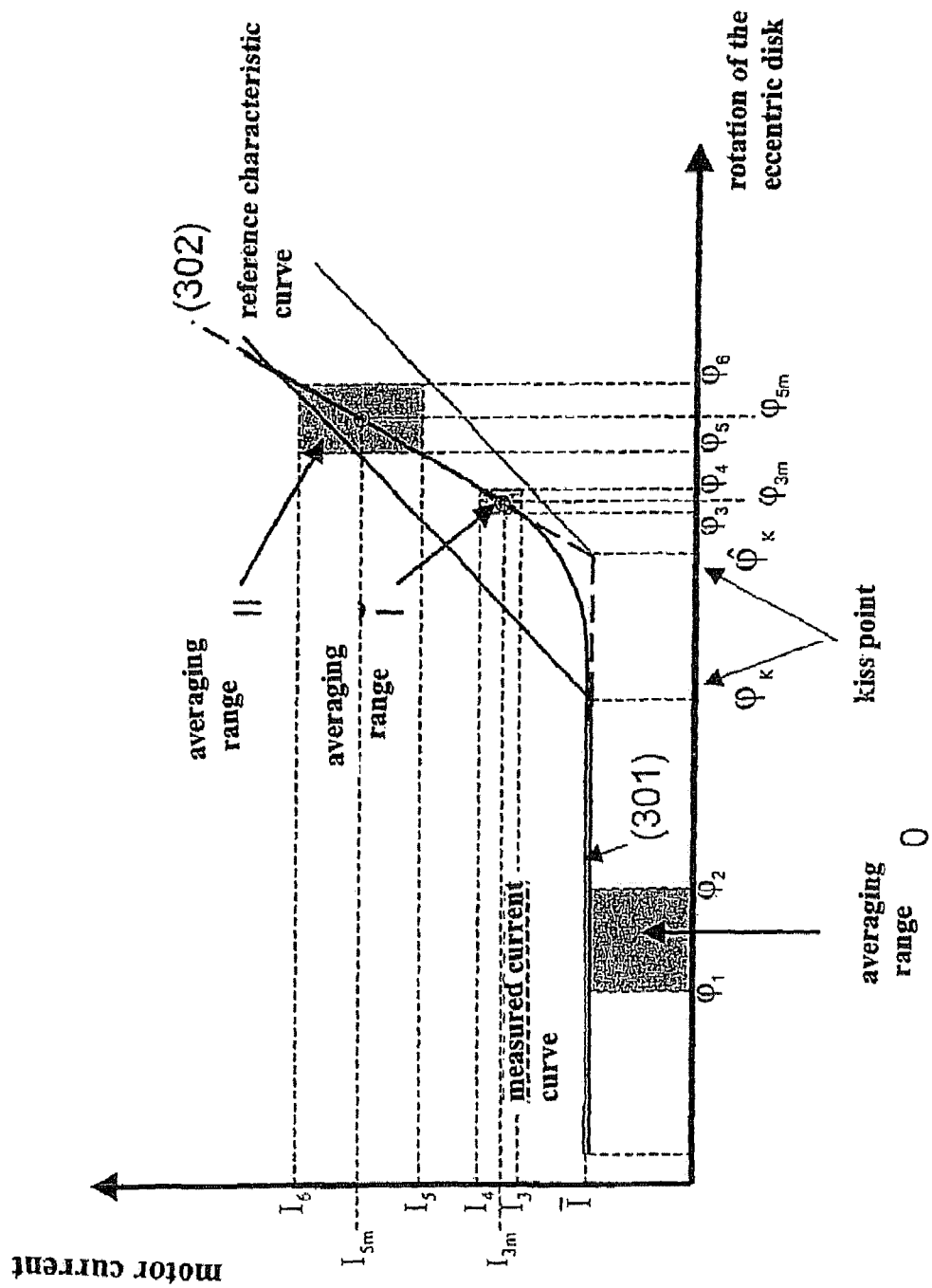
FIG. 3 shows a conventional local distortion of the current characteristic curve.
Figure 4:
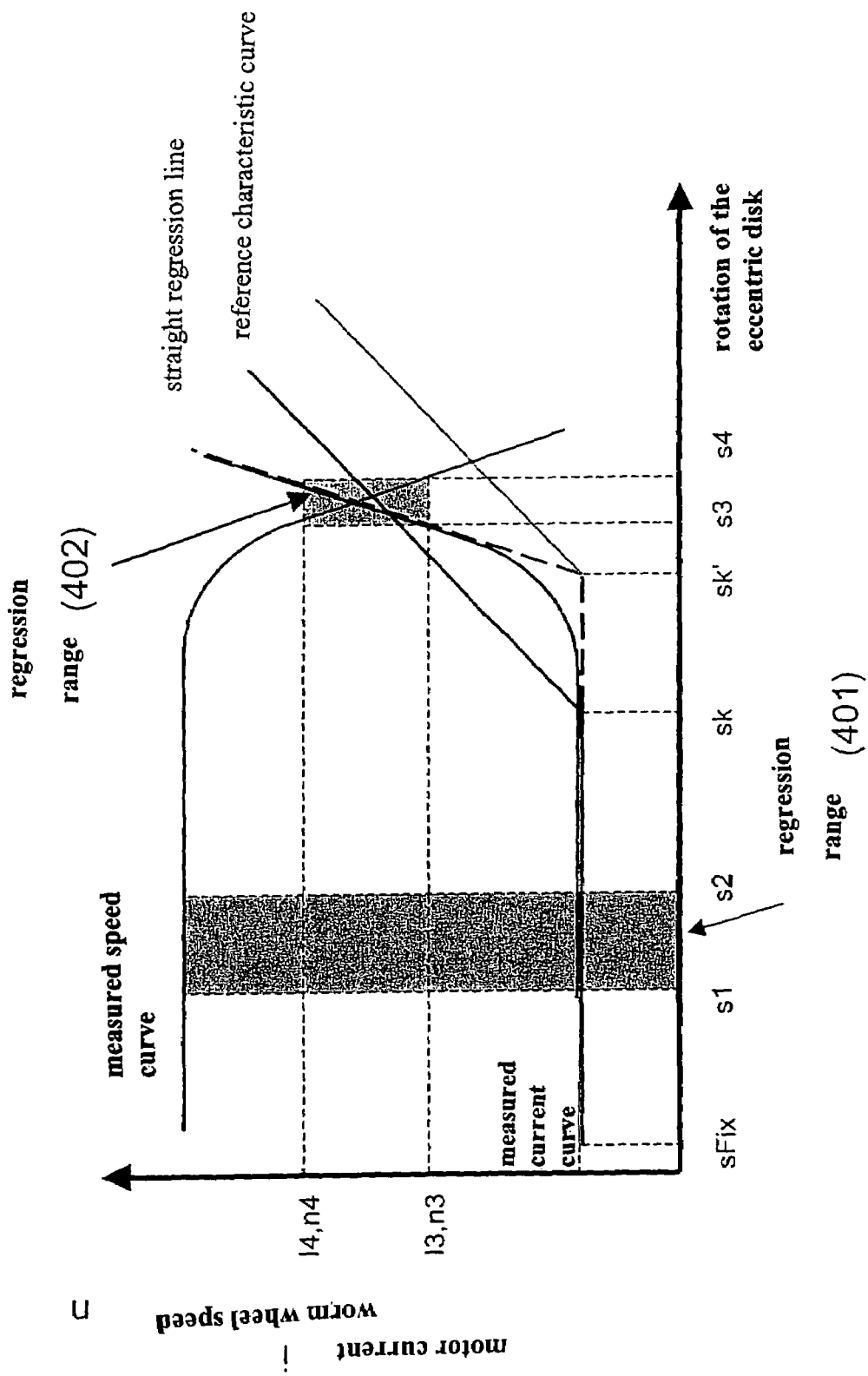
FIG. 4 shows the obtained signal curves of motor current and worm wheel speed=eccentric disk speed.
Figure 5:
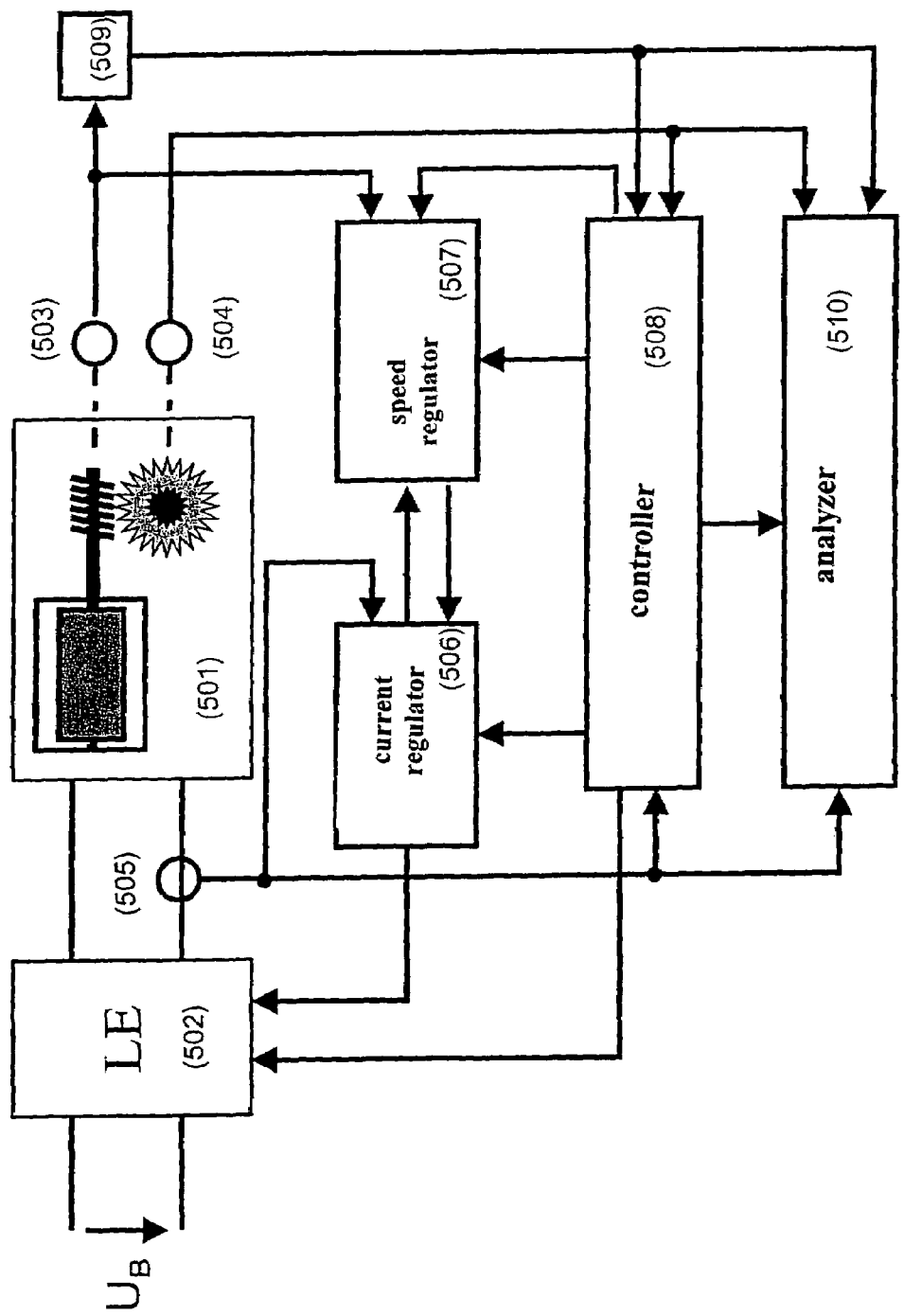
FIG. 5 shows the current regulator, the speed regulator, the controller and the analyzer arrangement.

DC transmission motor (101) of FIG. 1, i.e., the positioning motor, is triggered via an H bridge (502) of FIG. 5. In FIG. 5, two sensors (503, 504) for detecting the motor speed and the worm wheel position, respectively, are mounted on the positioning motor. A further sensor (505) is used for measuring the current. Current regulator (506) generates a control voltage from the current measured by current sensor (505) and the setpoint current specification, i.e., the output quantity of speed regulator (507); this control voltage is used as an input quantity of H bridge (502). Current regulator (506) may be a PI regulator having an anti-reset-windup function and the option to freeze the regulator output quantity and the internal regulating states as a function of a control quantity.

Speed regulator (507) receives its input quantity, the measured motor speed, from speed sensor (503) and the motor speed setpoint value from controller (508). Speed regulator (507) may be a PI regulator having an extended anti-reset-windup function which takes into account the state of the current regulator, and the option to freeze the regulator output quantity and the internal regulating states as a function of a control quantity. Controller (508) controls the entire calibration process. The required signal quantities worm wheel angle (504), worm wheel speed (509), and motor current (505) are made available by the corresponding sensor units or converting units (509); the worm wheel speed or eccentric disk speed may be computed from the motor speed of the positioning motor as a derived quantity using the known transmission ratio of the worm gear. The regression analysis of the motor current and worm wheel speed signal curves plotted against the worm wheel angle is performed in analyzer unit (510), configured and activated by the control unit.

Figure 6:
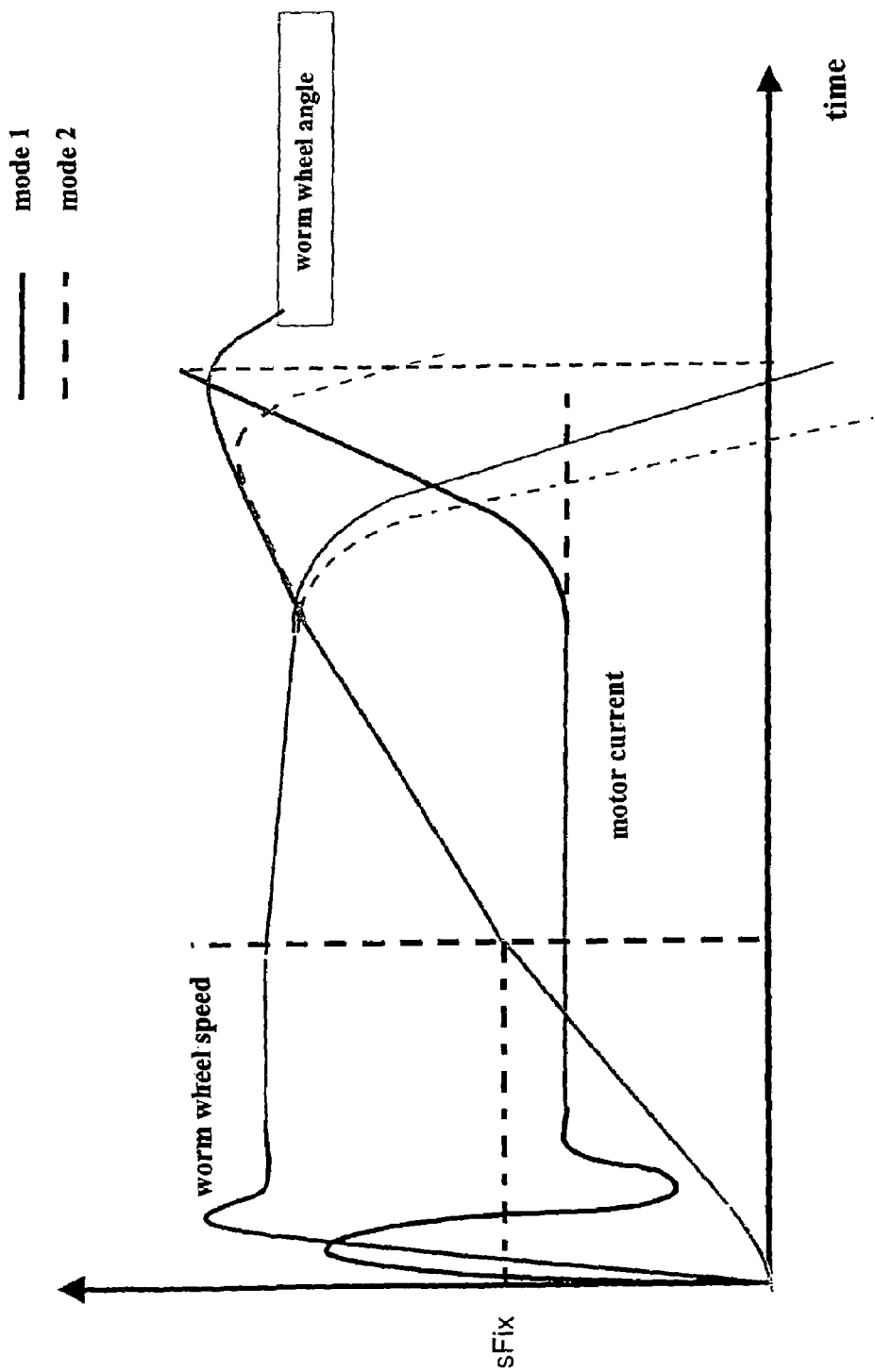
FIG. 6 shows the signal-time curves.

The overall function is divided into function units control and evaluation or analysis. The controller outputs the motor setpoint speed to the speed regulator and, at the same time, activates the function of the speed regulator and the current regulator. The signal-time curves illustrated in FIG. 6 are obtained. The speed-regulated state remains activated until the worm wheel reaches position sFix. Thereafter the controller causes the regulator to freeze its manipulated variables as a function of the analysis mode. There are two modes here.

In mode 1 the manipulated variable of the current regulator is frozen (switched to constant) and all integral components of the regulator are reset. The analysis is performed at a constant voltage. In mode 2, the current regulator remains active; the controller causes only the speed regulator to freeze its manipulated variables. The analysis is performed at a constant current. After running through all regression intervals, the current regulator is reactivated (mode 1) and the controller outputs a current setpoint value which causes the positioning motor to move back to its initial position. This terminates the calibration process. Only one mode is allowed to be active at each calibration; this makes it possible to perform two calibration operations (mode 1, mode 2) sequentially. The calibration operations are best performed when the internal combustion engine of the motor vehicle is started or when the vehicle is at a standstill with the clutch disengaged. FIG. 7 shows a signal flow diagram of the control.

Analysis

Two regression analyses for each signal curve are performed in the analysis as a function of the mode selected by the controller. In mode 1, it is applied to the worm wheel speed signal curves plotted against the worm wheel position and, optionally, also to the motor current signal curves plotted against the worm wheel position. In mode 2, this application only makes sense for the worm wheel speed curve plotted against the worm wheel position due to the constant current regulation. Since the method is identical in principle for both curves, it is explained here only for the motor current as an example.

Figure 8:
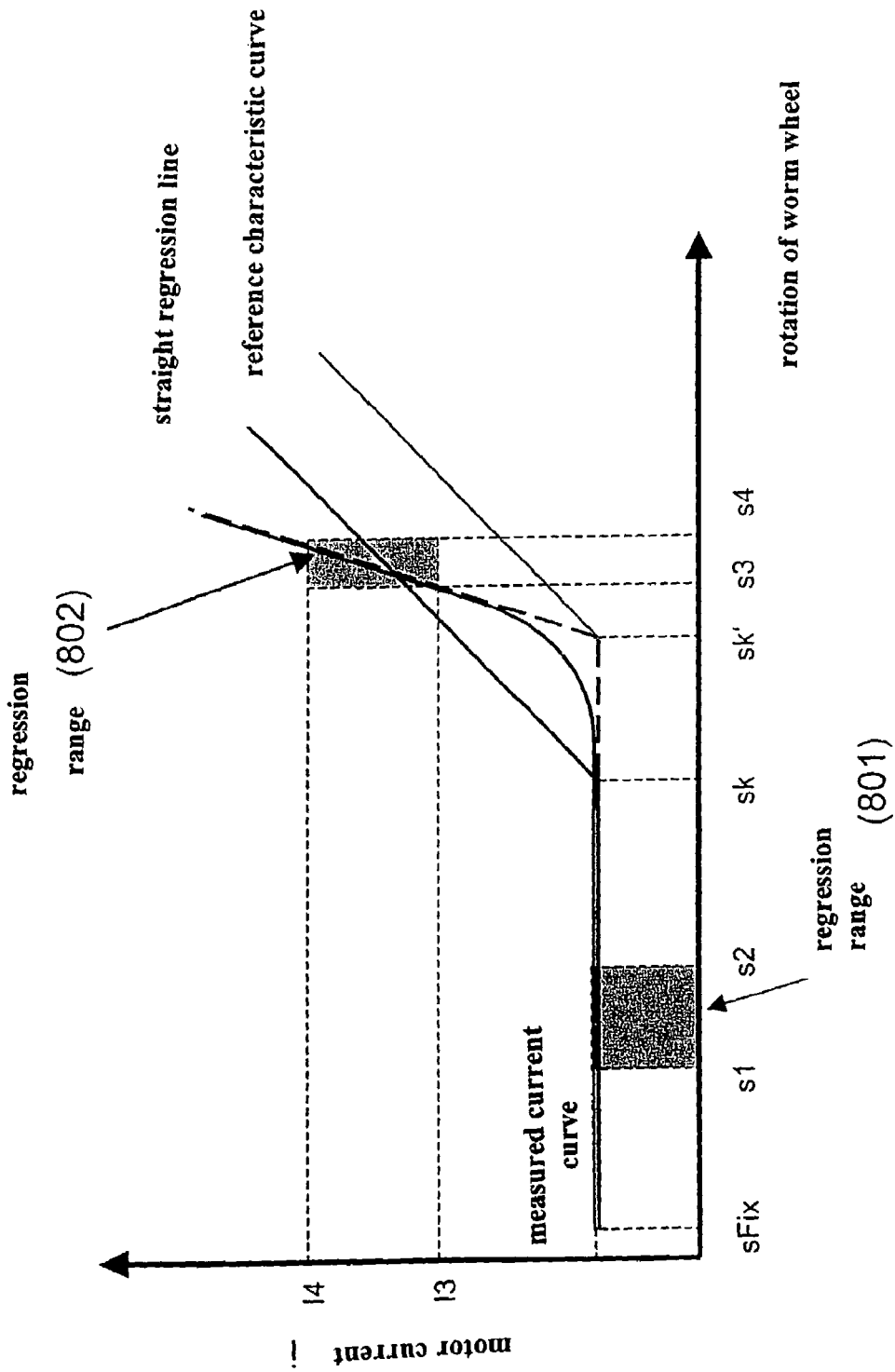
FIG. 8 shows a typical motor current signal curve specified by the controller.

The typical motor current signal curve specified by the controller is shown in FIG. 8. In first regression range (801), a linear regression is performed recursively using sampled pairs of values (s.I). The resulting straight regression line is stored using two parameters: straight line slope and ordinate segment. Subsequently, regression range (802) is run through within the controlled calibration process. A linear regression is performed again in this range, and the obtained straight regression line is stored again as the pair of parameters: straight line slope and ordinate segment. After all regression ranges have been run through, the point of intersection of the two straight regression lines is computed, and thus the kiss point is determined.

In general, the slope of the straight line in regression range (802) is approximately known, because the clutch characteristic barely changes in this direction and is therefore also known from previous analyses. A filter function may therefore be implemented which evaluates the range of confidence of the sampled signal values. Local regression ranges which are subsets of the original ranges and whose upper limits form the newly sampled pairs of values are formed within regression ranges (801), (802). Local straight regression lines are formed in a similar manner. If their slope differs from the expected slope, the latest sampled pair of values is weighted using a lower weight in the regression analysis or ignored altogether. The signal flow diagram of the analysis is shown in FIG. 9.

In summary, it is possible to state that a calibration process is performed to determine the point of engagement. A cascaded speed-current regulator is used. Positioning motor GM runs through the entire actuating range in part in the speed-regulated mode, in part in the voltage-regulated mode. The run is started using speed regulation. Starting from a predefined worm wheel position, the manipulated variables of the regulator are frozen (mode 1: current regulator deactivated; mode 2: current regulator active, speed regulator deactivated). The signal curves, mode 1: current as a function of the worm wheel position and worm wheel speed as a function of the worm wheel position, and mode 2: only worm wheel speed as a function of the worm wheel position, are recorded.

There is a fixedly defined regression range within the free travel path of the actuator. The signal curves are subjected to a linear regression here. The straight regression lines for speed and current are determined recursively. There is a second regression range as a function of the worm wheel speed or motor current. Here again the signal curves are subjected to a linear regression.

The local slopes are determined using linear regression within smaller subintervals whose upper limit is the currently sampled data pair. The comparison of the local slope with the expected slope, e.g., from previous calibrations, determines the weighting factor used for forming the new pairs of values in the main regression. The straight regression line is determined for this purpose after running through the second regression range. The point of intersection of the two straight regression lines is computed for each signal curve (as a function of the mode). The point of engagement (kiss point) is the point of intersection of the two straight regression lines.

What is claimed is:

1. A method for determining a point of engagement of a clutch operable via an actuating device, the actuating device having a positioning motor which is electrically drivable via a control unit, the output of the positioning motor providing a motor torque and a motor speed, the motor being operationally linked to an actuating mechanism which actuates the clutch, the method comprising:

at least one of detecting a rotational angle position at a motor output side and deriving a quantity therefrom, wherein the positioning motor is arbitrarily actuated by the control unit for determining a point of engagement so that the clutch is engaged; and performing, when a predeterminable rotational angle position of the positioning motor or the quantity derived therefrom is attained, at least one of the following:

in a first operating mode, applying a constant voltage to the positioning motor by the control unit and, at the same time, detecting the motor speed as a function of the rotational angle position, and in a second operating mode, applying by the control unit a constant current to the positioning motor and detecting motor speed as a function of the rotational angle position; and determining the point of engagement from detected values of the motor speed that are a function of the rotational angle position.

2. The method of claim 1, wherein the positioning motor is triggered in a speed-regulated mode until the predefinable rotational angle position of the positioning motor or the quantity derived therefrom is attained.

3. The method of claim 1, wherein a current regulator-speed regulator unit is connected in a cascade circuit, and wherein at least one of in the first operating mode, a manipulated variable of the current regulator is switched to be constant, and in the second operating mode, a manipulated variable of the speed regulator is switched to be constant.

4. The method of claim 1, wherein the point of engagement is determined by the control unit at a standstill of the motor vehicle.

5. The method of claim 1, wherein the point of engagement is determined by regression from the detected values of at least one of motor speed and motor current which are a function of the rotational angle position.

6. The method of claim 5, wherein two regression ranges are predefined, of which a first regression range is located in the free travel path of the actuating mechanism and a second regression range is located in the actuator load range of the actuating mechanism, in which the actuating mechanism is driven against the actuator load torque generated by the clutch, and the point of engagement is determined as a point of intersection of two determined straight regression lines.

7. The method of claim 1, wherein the clutch is situated in a transfer case of a motor vehicle having all-wheel drive.

8. The method of claim 1, wherein in the first operating mode, the motor current is also detected as a function of the rotational angle position.

9. The method of claim 1, wherein the point of engagement is detected from the detected values of the motor current that are a function of the rotational angle position.

10. A system for determining a point of engagement of a clutch operable via an actuating device, the actuating device having a positioning motor which is electrically drivable via a control unit, the output of the positioning motor providing a motor torque and a motor speed, the motor being operationally linked to an actuating mechanism which actuates the clutch, comprising:
a detecting arrangement for detecting at least one of detecting a rotational angle position at a motor output side and deriving a quantity therefrom, wherein the positioning motor is arbitrarily actuated by the control unit for determining a point of engagement so that the clutch is engaged; and
a second arrangement for performing, when a predeterminable rotational angle position of the positioning motor or the quantity derived therefrom is attained, at least one of the following:
in a first operating mode, applying a constant voltage to the positioning motor by the control unit and, at the same time, detecting the motor speed as a function of the rotational angle position, and
in a second operating mode, applying by the control unit a constant current to the positioning motor and detecting motor speed as a function of the rotational angle position; and
a determining arrangement for determining the point of engagement from detected values of the motor speed that are a function of the rotational angle position.

11. The system of claim 10, wherein the clutch is situated in a transfer case of a motor vehicle having all-wheel drive.

12. The system of claim 10, wherein in the first operating mode, the motor current is also detected as a function of the rotational angle position.

13. The system of claim 10, wherein the point of engagement is detected from the detected values of the motor current that are a function of the rotational angle position.

14. The system of claim 10, wherein a current regulator-speed regulator unit is connected in a cascade circuit and the manipulated variable of the current regulator (506) is switched to be constant in the first operating mode, and/or the manipulated variable of the speed regulator (507) is switched to be constant in the second operating mode.

15. The system of claim 10, wherein the point of engagement is determined by the control unit at a standstill of the motor vehicle.

* * * * *